United States Patent Office 3,472,789
Patented Oct. 14, 1969

3,472,789
ALKALI METAL FLUORIDE PELLETS
David Walter Cottrell, Avonmouth, Bristol, England, assignor to Imperial Smelting Corporation (N.S.C.) Limited, London, England, a British company
No Drawing. Filed Sept. 27, 1966, Ser. No. 582,271
Claims priority, application Great Britain, Oct. 7, 1965, 42,565/65
Int. Cl. C01d 11/04, 3/02
U.S. Cl. 252—441
5 Claims

ABSTRACT OF THE DISCLOSURE

Pellets containing potassium, rubidium and caesium alkali metal chlorides are converted into the corresponding fluorides by heating with diluted fluorine as a reactant gas at 100–400° C., avoiding melting during reaction.

---

This invention relates to the conversion of pellets containing alkali metal halides other than the fluoride into pellets of alkali metal fluorides, and particularly to the regeneration of alkali metal fluoride pellets from mixed alkali metal halide reaction products, which are produced during the fluorination of halogenohydrocarbons by means of alkali metal fluorides.

In the specifications of Patents 996,498 and 995,927 are described processes for the replacement of other halogen atoms by fluorine atoms in aromatic compounds containing carbon and halogen atoms only by solvent-phase and solid-vapour reactions, respectively. These techniques lead to good yields of otherwise rather inaccessible hexafluorobenzene and halogenofluorobenzenes. The preferred fluorinating reagents are alkali metal fluorides. However, one economic and technical disadvantage which has detracted somewhat from the merits of these processes in the past, has been the difficulty of reconverting the spent solid reaction products into a reactive fluoride for further reaction with the halogenocarbon. The solid reaction product contains metal halides, including unreacted fluoride, together with some organic residues.

Hitherto we have used, in practice, a new batch of alkali metal fluoride for each batch of organic material which is to be fluorinated. This is wasteful, and because alkali metal fluorides are expensive the process is not suited to commercial production.

The use of gaseous hydrogen fluoride to regenerate the alkali metal fluoride has been considered but thermo dynamic calculations show that the free energy change in reactions such as:

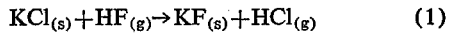

is unfavourable when chlorides of sodium potassium, caesium or dubidium are used.

Potassium chloride will, however, dissolve in anhydrous liquid hydrogen fluoride. Hydrogen chloride is evolved and potassium fluoride should be obtained, in principle, by evaporating hydrogen fluoride from the residue. In practice, severe corrosion problems have been encountered and the difficulties of handling highly hygroscopic metal fluorides make the process very difficult to operate indeed.

The direct reaction of the alkali metal halide mixture with fluorine gas would appear to be an attractive proposition, despite the cost of fluorine, because no liquid intermediates are formed. The process should, therefore, be suitable for the "in-situ" regeneration of a pellet packed, static bed reactor.

But the reaction $$2MCl_{(s)} + F_{2\,(g)} \rightarrow 2MF_{(s)} + Cl_{2\,(g)}$$

(M=K, Rb or Cs), is very exothermic, and is liable, unless special precautions are taken, to cause local overheating and fusing of the pellets thus rendering them useless until they have been repelletised. Under conditions where melting takes place, the above reaction has been reported to be superseded by reaction such as

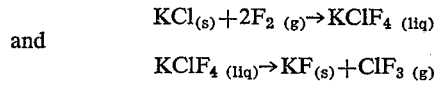

and $$KClF_{4\,(liq)} \rightarrow KF_{(s)} + ClF_{3\,(g)}$$

Such reaction would obviously be wasteful and costly, as three-quarters of the original fluorine used are evolved as chlorine trifluoride.

We have now discovered that provided the fluorine is used in diluted form and temperature limitations are adhered to, pellets containing alkali metal chlorides can be reacted with fluorine gas to produce alkali metal fluorides without appreciable melting of the pellets and without evolution of chlorine trifluoride, at least until substantially the whole of the chloride has been converted to fluoride.

The invention accordingly provides a method of converting pellets containing alkali metal chlorides into pellets of alkali metal fluorides which method comprises heating the pellets to a temperature of from 100° C. to 400° C. and contacting the heated pellets with a reactant gas containing fluorine and at least twice its volume of an inert diluent, under such conditions that there is no appreciable melting of the pellets during reaction.

It will be appreciated that the halides to which the method is applied in commercial practice will be the chlorides of potassium rubidium or caesium.

The fluorine may conveniently be generated, as required, in an electrolytic fluorine cell, and used at a pressure of substantially one atmosphere. The inert diluent gas may conveniently be nitrogen or helium, and may be recirculated during the regeneration process. In order to purify the fluorine from traces of hydrogen fluoride before use, it may be passed through a bed of particulate sodium fluoride, e.g., in pelleted form.

The alkali metal halide pellets are heated to a temperature of from 100° C. to 400° C., preferably from 200° C. to 300° C. The heat of reaction causes local temperature rises, which may be of the order of 30° C. to 40° C., but should desirably not exceed 50° C. Of course, if the fluorine is in sufficient dilution, no other cooling means will be necessary but it may be economic to provide some other heat-exchange means for removing the excess heat from the bed of pellets. It is preferred that the reactant gas contains from 3 to 10 volumes of inert diluent per volume of fluorine. The pressure used may be superatmospheric, atmospheric or subatmospheric but preferably a pressure of one atmosphere, or slightly above is used. The material from which the reactor is constructed must be resistant to attack by elemental fluorine and chlorine. Nickel and/or nickel alloys are preferred materials of construction.

Of course, the alkali metal fluoride converted from the chloride by the method of this reaction constitutes in itself another aspect of this invention.

This reaction has a number of advantages which offset the high cost of electricity which is the main disadvantage in using fluorine. The fluoride is added (to the fluorine cell) as inexpensive hydrogen fluoride. The efficiency of use of fluorine in conversion of potassium chloride to fluoride exceeds 95%. The evolved chlorine is a valuable by-product. Pelleted alkali fluoride is not broken up or melted during regeneration.

The chlorides may, as mentioned above, also contain organic residues from a previous fluorination reaction carried out on aromatic halogeno compounds. These residual organic and carbonaceous materials may be oxidised with oxygen or air at a temperature of about 400° C.—600° C. prior to the passage of fluorine. The metal fluoride pellets are thus produced in a clean and reactive state.

The following examples illustrate the invention.

EXAMPLE 1

Fluorine from an electrolytic cell was passed at about 5 g./hour through sodium fluoride pellets to remove hydrogen fluoride and then into a vertical nickel reactor containing 150 g. of potassium chloride pellets (99.8% pure). Gas leaving the reactor was analysed for chlorine and fluorine containing compounds such as ClF and $ClF_3$. 38.2 g. of fluorine passed of which 36.9 g. reacted with the potassium chloride and an equivalent amount of chlorine was evolved. The reaction temperature commenced at 380° C. and reached a maximum of 410° C. The fluorine was diluted with three volumes of nitrogen per volume of fluorine. The reaction time was eight hours. 117 g. of product was recovered which contained negligible chloride, and had the characteristic specific fluorination properties of potassium fluoride.

EXAMPLE 2

17.5 g. of KCl pellets were reacted with fluorine, diluted with three volumes of nitrogen, at 260° C. 13.7 g. of pellets were recovered from the reactor. The theoretical yield of KF would be 13.6 g. The pellets showed no signs of having fused during the reaction and had the characteristic fluorination properties of potassium fluoride.

EXAMPLES 3 AND 4

Fluorine was passed through a bed of particulate sodium fluoride to remove hydrogen fluoride, mixed with nitrogen, and passed through a bed of ⅛″ potassium chloride pellets. The resulting gas was passed through a bed of sodium chloride pellets and then through caustic bisulphite scrubbers. Correct back pressure on the electrolytic cell used to supply the fluorine was maintained by a water pump positioned downstream of the scrubbers. The scrubbers were eventually analysed for Cl by Volhard's method. The potassium chloride was assumed to be fluorinated when the sodium chloride became hot, i.e., when breakthrough of fluorine occurred. Conditions and results are given in the following table.

|  | Example 3 | Example 4 |
|---|---|---|
| Temperature of bulk of KCl, ° C. | 300–400 | 100–120 |
| Average local rise, ° C. | 30 | 30 |
| Maximum local rise, ° C. | 40 | 40 |
| Fluorine cell voltage | 6.6 | 7.5 |
| Current (amps) | 10 | 11 |
| Efficiency (Percent) | 70 | 70 |
| Duration of experiment (hrs.) | 8 | 7¼ |
| Total fluorine passed (gms.) | 38.16 | 39.70 |
| Fluorine in NaCl (gms.) | 1.33 | 1.96 |
| Fluorine used in KCl conversion (gms.) | 36.83 | 37.74 |
| Weight of KCl in (gms.) | 150.0 | 149.9 |
| Weight of KF out (gms.) | 117.1 | 118.05 |
| Theoretical weight of KF out (gms.) | 116.8 | 116.7 |
| Flow of nitrogen (l/hr.) | 18 | 7 |
| Nitrogen to fluorine ratio (v:v) | 10:1 | 3:1 |
| $ClF_3$ found (starch iodide test) | None | None |
| Comments | (¹) | (²) |

¹ Very little sign of melting. Some Cl only in topmost pellets.
² Very little sign of melting.

I claim:
1. A method of converting pellets containing alkali metal chlorides selected from potassium, rubidium and caesium chlorides into pellets of alkali metal fluorides, which method comprises heating the pellets to a temperature of from 100° C. to 400° C. and contacting the heated pellets with a reactant gas containing fluorine and at least twice its volume of an inert gaseous diluent, under such conditions that there is no appreciable melting of the pellets during reaction.

2. A method as claimed in claim 1 wherein the pellets are heated to a temperature of from 200° C. to 300° C.

3. A method as claimed in claim 1 wherein the diluent gas is nitrogen.

4. A method as claimed in claim 1 wherein the reactant gas contains from 3 to 10 volumes of inert diluent per volume of fluorine.

5. A method as claimed in claim 1 when performed at a pressure of substantially one atmosphere.

References Cited

UNITED STATES PATENTS 2,673,139    3/1954    Woolf _____ 23—88

OTHER REFERENCES

Inorg. Chem., Phillips and Williams, vol. 1, Oxford Press, 1965.

DANIEL E. WYMAN, Primary Examiner

PHILIP M. FRENCH, Assistant Examiner

U.S. Cl. X.R.

23—89